R. E. COLE.
VEHICLE WHEEL.
APPLICATION FILED APR. 27, 1911.
1,068,107.
Patented July 22, 1913.
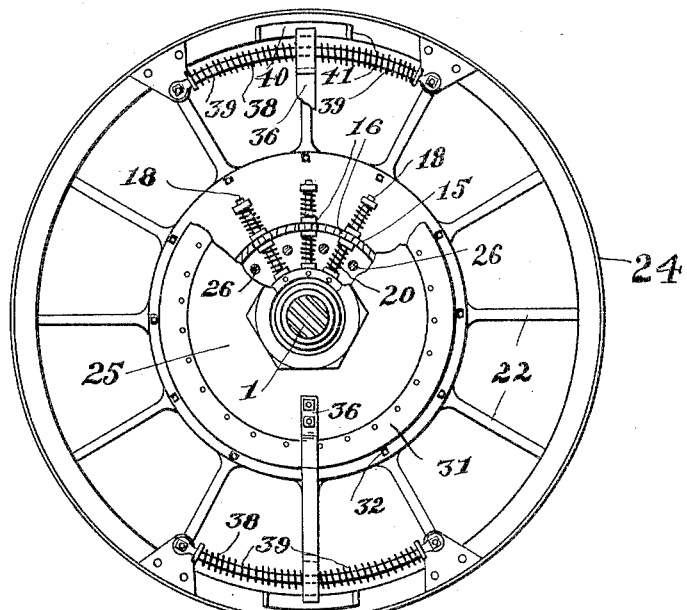
Fig.1.
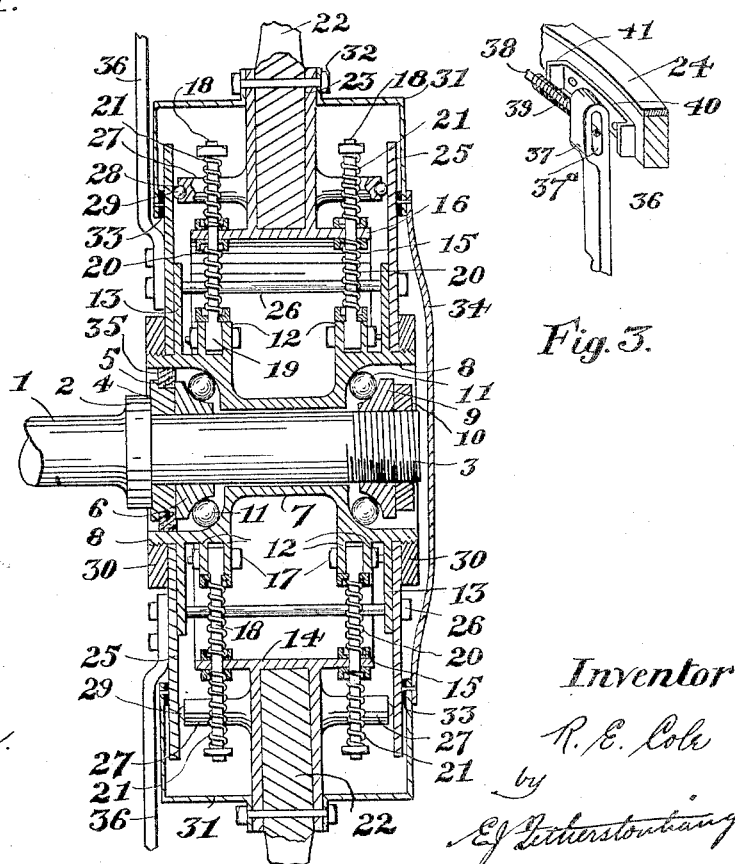
Fig.2.
Fig.3.
Witnesses
D. G. Joy.
D. Jack
Inventor
R. E. Cole
by
E. J. Fetherstonhaugh
atty.

UNITED STATES PATENT OFFICE.

ROBERT EDGAR COLE, OF HIGHLAND CREEK, ONTARIO, CANADA, ASSIGNOR OF ONE-HALF TO WILLIAM DOUGLAS, OF TORONTO, CANADA.

VEHICLE-WHEEL.

1,068,107. Specification of Letters Patent. Patented July 22, 1913.

Application filed April 27, 1911. Serial No. 623,725.

*To all whom it may concern:*

Be it known that I, ROBERT EDGAR COLE, a subject of the King of Great Britain, resident of Highland Creek, county of York, Province of Ontario, in the Dominion of Canada, have invented certain new and useful Improvements in Vehicle-Wheels; and I do hereby declare that the following is a full, clear, and exact description of the same.

The invention relates to improvements in vehicle wheels, as described in the following specification and illustrated in the accompanying drawings that form part of the same.

The invention consists essentially in the novel construction and arrangement of parts, whereby the wheel hub is resiliently supported centrally within the wheel.

The objects of the invention are, to overcome the difficulties, expense and dangers incident to the use of pneumatic tires, and to devise a simple form of resilient wheel which will eliminate the transmission of vibration and the strains of travel to the frame of the vehicle.

In the drawings, Figure 1 is a side elevational view of a wheel constructed in accordance with this invention, shown partly broken away and in part section. Fig. 2 is an enlarged cross sectional view of the central portion of the wheel. Fig. 3 is an enlarged perspective detail portion of the wheel rim and means for transmitting power thereto.

Like numerals of reference indicate corresponding parts in each figure.

Referring to the drawings, 1 is the wheel axle formed with a shoulder 2 and having a threaded outer end 3.

4 is a ring abutting the shoulder 2 and having an annular groove 5 in its periphery.

6 is a cone bearing encircling the axle 1 and abutting the ring 4.

7 is the wheel hub loosely encircling the end 3 of the axle and having the cupped ends 8 forming ball races.

9 is a cone adjustably supported on the threaded end 3 of the axle and 10 is a lock nut threaded on said axle and adapted to lock the cone 9.

11 are ball bearings arranged between the cones 6 and 9 and the ball races in the cupped ends 8.

12 are annular flanges arranged in pairs equidistant from the center of the hub 7 and formed integral therewith and extending outwardly therefrom and 13 are annular flanges arranged to the outside of the outer flanges 12 and preferably forming part with said hub.

14 is an annular ring of considerably larger diameter than the outer periphery of the flanges 12 and having the lateral flange portions 15 extending over the said flanges 12, said flanges 15 having a plurality of slots 16 arranged in a circumferential row and equidistant from the center and radially opposite the center line between each pair of flanges 12.

17 are bolts extending through suitable holes in the flanges 12 and spaced equidistant.

18 are bolts having eye shaped heads 19 encircling the bolts 18, said bolts 18 extending radially outward through the slots 16 in the flanges 15 and being threaded on their outer ends and provided with suitable nuts.

20 are spiral springs encircling the bolts 18 between the flanges 12 and 15 and 21 are spiral compression springs encircling the ends of the said bolts extending beyond the flanges 15, suitable washers being arranged at each end of the said springs. The springs 20 and 21 being all of a uniform cross section and length, through the eye bolts 18 support the hub 7 centrally within the annular ring 14.

22 are the wheel spokes secured in the sockets 23 formed in the ring 14, said spokes extending radially outward from said ring and being secured to the wheel rim 24.

25 are annular shaped plates encircling the outer ends of the hub 7 and abutting the flanges 13 and rigidly held thereto by the cross bolts 26 extending through said plates and flanges and across the hub, said bolts being arranged midway between the eye bolts 18 and about midway between the outer periphery of the flanges 12 and the inner surface of the ring 14. The bolts 26 thus perform a double function in securing the plates 25 rigidly in place and in forming stops to limit the movement of the annular ring in springing in and out upon the spiral springs 21.

27 are lugs projecting laterally from the side walls of the ring 14 and extending into close proximity with the inner face of the plates 25 and having the recesses 28 in the outer ends thereof.

29 are steel balls arranged in the recesses 28 and engaging the inner faces of the plates 25 and forming a rolling contact with the supporting lugs 27.

30 are nuts threaded on the outer ends of the cupped ends 8 of the hub 7 and clamping the inner edges of the plates 25 securely.

31 are annular shields rigidly secured to the ring 14 by the bolts 32 extending through the spokes, said shields extending outwardly and overlapping the outer surfaces of the plates 25 and having the felt dust rings 33 secured to the inner faces and abutting said plates 25.

34 is a circular dished plate secured to the shield 31 on the outer side of the wheel completely closing in the hub and wheel center mechanism.

35 is a dust washer secured in the annular groove 5 in the ring 4 and engaging the inner wall of the cupped end of the hub.

36 are arms rigidly secured to the plate 25 on the inner side of the wheel and extending radially outward therefrom and having the outer ends 37 formed with transverse slots 37$^a$ therethrough.

38 are arc-shaped rods rigidly secured at the ends to the rim of the wheel and extending through the slots 37$^a$ in the outer ends of the arms 36.

39 are spiral compression springs encircling the rods 38 to each side of the arms 36.

40 are brackets secured to the side of the rim and having the outwardly projecting lugs 41 at each end adapted to engage the outer ends of the arms 36 to limit the movement of said arms.

In the use of this wheel, the hub and axle journaled therein are suspended centrally within the wheel, the weight being carried by the springs 20 and 21. The vibration of travel caused by the inequalities in the road are absorbed by the said springs 20 and 21 so that the hub and axle and other portions of the running gear of the vehicle are free of vibration. Any sudden shocks caused by striking obstructions in the road surface are materially absorbed by the said spiral springs so that the effect on the running gear will be very slight. The side strains caused by the swinging and swaying of the vehicle and inequalities in the road is taken up by the lateral lugs 27, the balls 29 rolling within the recesses 28 and forming a rolling contact between the said lugs and the plates 25 which plates are rigid with the hub.

The dust shields 31 effectually prevent the dust and dirt from getting into the inner portion of the wheel center and being arranged as described move freely with the outer portion of the wheel but retain contact with the plates 25 at all times.

In driven wheels to which power is applied it is desirable to provide a means for conveying the torque direct to the outer portion of the wheel as the eye bolt construction does not allow of the proper transmission of power. In order to accomplish a proper transmission of power from the center of the wheel to the rim I have arranged the arms 36 which are rigidly secured to the plates 25 and connected to the wheel rim by the rods 38 and the said arms being slotted longitudinally are free to move with the wheel center and the transmission is effected through the compression springs 39 encircling the said rods. The springs 39 may be made any desired strength according to the weight and power of the vehicle and as the center portion or plates 25 are driven the movement is transmitted through the arm 36 and springs 39 to the wheel rim. The brackets 40 form positive stops so that in the event of extraordinary stress being placed upon the gear the springs 39 will act until the arm engages the said stops and a direct and positive drive thus effected.

What I claim as my invention is:—

1. A vehicle wheel comprising in combination with an outer rim and an inner rim supported upon spokes rigid with said outer rim and having a pair of lateral flanges extending to each side, said lateral flanges having a plurality of radially arranged slots spaced equidistant therearound, a hub having a plurality of annular flanges arranged in pairs in alinement with said radial slots, bolts pivotally secured between said paired flanges and extending radially outward through said slots, spiral springs encircling said bolts to the inner and outer sides of said flanges and forming spring supports for the hub, flat annular plate members rigidly secured to the hub to the outside of said bolts and extending beyond the lateral flanges of the inner rim, guide lugs forming part with the inner rim extending laterally therefrom and engaging said annular plates and adapted to restrict the relative movement laterally of said hub and rims, and tie bolt members spaced around said annular plates and adapted to support said plates the one from the other and to form stops to limit the up and down movement of the hub relative to the wheel.

2. In a vehicle wheel, a rim, spokes extending radially inward from said rim, an annular member secured to the inner ends of said spokes and having lateral flanges, a hub, bolts pivotally secured to said hub and extending radially outward through said lateral flanges, spiral compression springs encircling said bolts and supporting the hub centrally within said annular member, annular plates rigidly secured to said hub, means projecting laterally from said annular member and engaging the inner faces of said annular plates to hold the rim in central vertical alinement with the hub, arms rigidly secured to said plates and extending radially outward therefrom and having slotted outer ends, arc shaped rods supported from said rim and extending
5 through said slotted arms, and compression springs encircling said rods and engaging said arms.

Signed at the city of Toronto, county of York, Ontario, Canada, this 3rd day of April 1911.

ROBERT EDGAR COLE.

Witnesses:
H. DENNISON,
E. HERON.

Copies of this patent may be obtained for five cents each, by addressing the "Commissioner of Patents, Washington, D. C."